(12) United States Patent
Klishchat

(10) Patent No.: US 7,632,770 B2
(45) Date of Patent: Dec. 15, 2009

(54) INDUSTRIAL CERAMIC SHAPED BODY AND PROCESS FOR PRODUCING SAME

(75) Inventor: Hans-Jürgen Klishchat, Gleichen (DE)

(73) Assignee: Refratechnik Holding GmbH, Ismaning (DE)

( * ) Notice: Subject to any disclaimer, the term of this patent is extended or adjusted under 35 U.S.C. 154(b) by 97 days.

(21) Appl. No.: 10/539,647

(22) PCT Filed: Dec. 29, 2003

(86) PCT No.: PCT/EP03/10808

§ 371 (c)(1),
(2), (4) Date: Aug. 8, 2006

(87) PCT Pub. No.: WO2004/056718

PCT Pub. Date: Jul. 8, 2004

(65) Prior Publication Data

US 2006/0266268 A1    Nov. 30, 2006

(51) Int. Cl.
*C04B 35/04* (2006.01)
*C04B 35/057* (2006.01)
*C04B 35/10* (2006.01)

(52) U.S. Cl. .................. 501/119; 501/113; 501/123; 501/124; 501/125

(58) Field of Classification Search .......... 501/113, 501/123, 119, 124, 125
See application file for complete search history.

(56) References Cited

U.S. PATENT DOCUMENTS

| | | | |
|---|---|---|---|
| 4,158,569 A * | 6/1979 | Brothers et al. | 501/132 |
| 4,842,647 A | 6/1989 | Ichikawa et al. | 106/382 |
| 4,960,737 A * | 10/1990 | Guile et al. | 501/125 |
| 5,420,087 A * | 5/1995 | Wieland et al. | 501/124 |

FOREIGN PATENT DOCUMENTS

| | | | |
|---|---|---|---|
| DE | 29 41 508 C2 | | 11/1983 |
| DE | 37 42 415 C1 | | 1/1988 |
| DE | 37 27 619 C1 | | 11/1988 |
| DE | 38 23 410 C1 | | 5/1989 |
| DE | 38 04 279 C2 | | 11/1992 |
| DE | 42 30 161 A1 | | 3/1994 |
| DE | 197 28 368 C1 | | 3/1999 |
| DE | 199 36 292 A1 | | 2/2001 |
| DE | 101 24 926 A1 | | 11/2002 |
| EP | 1178023 | * | 6/2002 |
| JP | 57-57824 | | 4/1982 |
| JP | 1-237049 | | 9/1989 |
| JP | 10-258343 | | 3/1997 |
| WO | 0001638 | * | 1/2000 |
| WO | 0190030 | * | 11/2001 |

OTHER PUBLICATIONS

K. Schwerdtfeger "Metallurgy of Continuous Casting", Verlag Stahleisen, Dusseldorf XP002264211, ISBN: 3-514-00350-5; Seite 236, Absatz 1; Tabelle 3.2.1. pp. 232-237. Publisher: Stahleisen (1992).
Translation of K. Schwerdtfeger "Metallurgy of Continuous Casting", Verlag Stahleisen, Dusseldorf XP002264211, ISBN: 3-514-00350-5; p. 236, Paragraph 1; Table 3.2.1. pp. 232-237. Publisher: Stahleisen (1992).

* cited by examiner

Primary Examiner—Karl E Group
(74) Attorney, Agent, or Firm—Brinks Hofer Gilson & Lione

(57) ABSTRACT

The invention relates to a fired, basic, refractory, industrial ceramic shaped body comprising at least one basic resistor component and an elasticizer component, wherein the elasticizer component is a calcium aluminate having the abbreviated formula $CA_6$. The invention additionally relates to a process for producing the shaped body and to its use.

15 Claims, No Drawings

INDUSTRIAL CERAMIC SHAPED BODY AND PROCESS FOR PRODUCING SAME

CROSS REFERENCE TO RELATED APPLICATION

This application claims priority to PCT/EP2003/10808 Sep. 29, 2003 and DE 102 59 826.6 filed Dec. 19, 2002.

FIELD OF THE INVENTION

The invention relates to a fired, basic, refractory, industrial ceramic, elasticized shaped body based on at least one resistor component such as magnesia and dolomite. In addition, the invention relates to a process for producing the shaped body and to its use.

BACKGROUND OF THE INVENTION

Shaped bodies of the generic type are used as refractory lining, in particular in high-temperature processes involving exposure to basic slag, e.g. in furnaces, tanks or vessels in the cement, lime, dolomite, magnesite, steel and nonferrous metals industries and also in the glass industry.

Although a shaped body composed of a resistor component (hereinafter also referred to simple as resistor) such as MgO or CaO/MgO (dolomite) has a high fire resistance and good chemical resistance, it is generally brittle because it has a relatively high modulus of elasticity (E) and an unfavorable shear modulus (G). This has an adverse effect on, in particular, the dissipation of thermal stresses, the mechanical stressability and the thermal shock resistance (TSR). It is therefore desirable to set low elastic moduli because these affect the thermomechanical durability.

To increase the elasticity or to reduce the elastic moduli, it is known that it is possible to add an elasticizer component (hereinafter also referred to simply as elasticizer) to a mix for producing a shaped body or to add raw materials which generate the elasticizer in the mix during ceramic firing.

For example, magnesia-chromite bricks or magnesia-spinel bricks which display usable shear moduli in the range from 8 to 12 GPa (gigapascal) are produced using chromium ores or synthetic spinel.

Refractory bricks containing molten hercynite or molten zirconium oxide as elasticizer have a low elasticity but are ductile. The shear moduli are from about 15 to 20 GPa and therefore relatively high.

These known elasticized, basic, refractory shaped bodies are evaluated, in particular, in respect of elasticity, desired deposit formation in a rotary tube furnace, redox resistance, alkali resistance, hydration resistance and disposability, with each of these known shaped bodies having, in terms of these properties, advantages and disadvantages, which can be seen from the following table:

TABLE 1

Qualitative properties of known shaped bodies

|   | Magnesia-spinel brick | Magnesia-hercynite brick | Magnesia-chromite brick | Magnesia-zirconia brick | Dolomite brick |
|---|---|---|---|---|---|
| Elasticity | good | poor | good | good | poor |
| Deposit formation | poor | good | good | poor | good |
| Redox resistance | good | poor | poor | good | good |
| Alkali resistance | good | poor | poor | good | poor |
| Hydration resistance | good | good | good | good | poor |
| Disposability | good | good | poor | good | good |

Magnesia-spinel bricks and magnesia-zirconia bricks form a stable deposit in a rotary tube furnace only with difficulty; they consequently have only limited usability in, for example, the sintering zone of a rotary tube furnace for cement. Although magnesia-hercynite bricks display good deposit formation, they have a poor redox resistance and alkali resistance. The same applies to magnesia-chromite bricks which are additionally known to create disposal problems. Dolomite bricks containing no elasticizer do ensure very good deposit formation but are neither sufficiently alkali resistant nor sufficiently hydration resistant.

It is an object of the invention to provide a basic, elasticized, refractory shaped body which combines high fire resistance and good chemical resistance with, in particular, good elasticity and good deposit formation capability, and good redox, alkali and hydration resistance and can be disposed of without problems.

SUMMARY OF THE INVENTION

According to the invention, sintered magnesia and/or fused magnesia or sintered dolomite and/or fused dolomite, selected from among the numerous known resistors, is/are used as basic resistor. In addition, the resistor component may contain one or more of the following, sintered MgO, fused magnesia, sintered dolomite, and fused dolomite. Calcium aluminate having a $CaO/Al_2O_3$ ratio of from 0.14 to 0.2, in particular of the chemical composition $CaAl_{12}O_{19}$ having the oxide formula $CaO.6Al_2O_3$ or the abbreviated formula $CA_6$, has been found as an elasticizer.

Calcium hexaaluminate has the chemical formula $CaAl_{12}O_{19}$ or the mineral name "hibonite" and the oxide formula $CaO.6Al_2O_3$ or the abbreviated formula $CA_6$.

The $Al_2O_3$ of the $CA_6$ does not react with the alkali metal and calcium compounds, e.g. in the rotary tube furnace for cement, because it is already saturated with CaO. This results in a very good corrosion resistance. The CaO in the $CA_6$, which is also the main constituent of the cement clinker material, probably ensures very effective deposit formation in the rotary tube furnace, which cannot be achieved even with the deposit-forming, known, elasticized, refractory shaped bodies such as magnesia-hercynite bricks or magnesia-chromite bricks.

$CA_6$ is not an unknown in refractory materials. A refractory shaped body whose mineral oxidic component is formed by a mineral phase mixture of $\alpha-Al_2O_3$, $\beta-Al_2O_3$, $CA_6$ and $CA_2$ is known. The mineral phase mixture is said to increase the corrosion resistance of the shaped bodies. $CA_6$ does not play an elasticizing role here.

A shaped body of the present invention may comprise from 60 to 99.5% by mass of the resistor component and from 0.5 to 40% by mass of the elasticizer component.

A shaped body of the present invention may have a porosity of from 12 to 25% by volume. A shaped body may also have a porosity of from 14 to 23% volume. A shaped body of the present invention may have a cold compressive strength above 35 MPa, and a cold flexural strength above 2 MPa. In addition, a shaped body of the present invention may have a cold compressive strength above 45 MPa, and a cold flexural strength above 2 MPa. Further, a shaped body of the present invention may have a modulus of elasticity of from 14 to 35 GPa, and a shear modulus of from 6 to 15 GPa. A shaped body of the present invention may have a modulus of elasticity of from 15 to 32 GPa, and a shear modulus of from 7 to 14 GPa. A shaped body of the present invention may have a thermal shock resistance of greater than 80.

DETAILED DESCRIPTION AND EXAMPLES OF THE INVENTION

The invention is illustrated below with the aid of an example:

Magnesia having a maximum particle size of 4 mm and a particle size distribution corresponding to a typical Fuller curve and the mineral calcium hexaaluminate having a particle size range from 0.5 to 4 mm were mixed, admixed with a required amount of lignin sulfonate as binder, shaped to form bricks and pressed at a specific pressing pressure of 130 MPa. After drying at 110° C., the bricks were fired at a sintering temperature of 1600° C. in a tunnel kiln.

The achieved properties of the fired bricks as a function of the amount of calcium hexaaluminate added are shown in table 2 below. A magnesia brick fired in the same way was employed as comparison.

TABLE 2

Properties of shaped bodies according to the invention compared to properties of a magnesia brick

| Magnesia | % by mass | 100 | 92 | 84 | 76 |
|---|---|---|---|---|---|
| $CA_6$ | % by mass | — | 8 | 16 | 24 |
| Overall density | g/cm$^3$ | 2.99 | 2.99 | 2.98 | 2.97 |
| Porosity | % | 16.12 | 16.26 | 16.42 | 16.41 |
| CCF | MPa | 75.30 | 72.20 | 71.10 | 71.40 |
| CFS | MPa | 12.10 | 6.10 | 5.80 | 5.50 |
| Modulus of elasticity | GPa | 91.90 | 31.20 | 27.10 | 22.80 |
| Shear modulus | GPa | 41.50 | 12.80 | 11.40 | 10.60 |
| TSR | | 15 | >100 | >100 | >100 |

It can be seen from table 2 that the bricks or shaped bodies according to the invention are sufficiently elasticized for use in a rotary tube furnace for cement with its temperature-dynamic conditions. The elastic moduli are within a very good range. The thermal shock resistance (TSR) is excellent. The shaped bricks may have an overall density of 2.5 to 3.2 p/cm$^3$ and a porosity of 12 to 25% by volume with a with a porosity between 14 to 23% by volume being preferred. The shaped bricks may also have a cold compressive strength above 35 MPa with above 45 MPa being preferred, and a cold flexural strength above 2 MPa. In addition, the shared bricks may have a modulus of elasticity from 14 to 32 GPa with 15 to 32 GPa being preferred and a shear modulus from 6 to 14 GPa with 7 to 14 GPa being preferred.

The mechanism which leads to the very good elasticization of the bricks has hitherto not been able to be determined unambiguously. There is presumably microcrack formation between the magnesia matrix and the calcium hexaaluminate during firing of the bricks, caused by the difference in the thermal expansion of these two materials. The bricks may comprise from 60 to 995% by mass of the resistor component and from 0.5 to 40% by mass of the elasticizer component.

Table 3 below shows the individual relevant properties of the known shaped bodies of table 1 and those of the shaped bodies according to the invention.

TABLE 3

Qualitative properties of known shaped bodies compared to a shaped body according to the invention

| | Magnesia-spinel brick | Magnesia-hercynite brick | Magnesia-chromite brick | Magnesia-zirconia brick | Dolomite brick | Magnesia-$CA_6$ brick |
|---|---|---|---|---|---|---|
| Elasticity | good | poor | good | good | poor | good |
| Deposit formation | poor | good | good | poor | good | good |
| Redox resistance | good | poor | poor | good | good | good |
| Alkali resistance | good | poor | poor | good | poor | good |
| Hydration resistance | good | good | good | good | poor | good |
| Disposability | good | good | poor | good | good | good |

Table 3 shows that all the types of brick known hitherto have significant disadvantages in terms of the application-relevant properties. In contrast, the magnesia-$CA_6$ bricks of the invention have exclusively good properties, as have hitherto not been known in their use-relevant combination.

Shaped bodies according to the invention can be used advantageously wherever severe temperature changes occur and wherever mechanical and thermomechanical stresses occur. These are, for example, sintering and transition zones of rotary tube furnaces in the brick and earth industry, in particular the cement, lime, dolomite and magnesite industries, ferrous and nonferrous metals industry and also melting and handling vessels in the iron or steel industry and the nonferrous metals industry. A shaped body according to the invention displays excellent usage performance in respect of hydration, alkali, redox and corrosion resistance combined with good deposit formation tendency. It is thus also superior to the known products after use because of unproblematical disposal possibilities. In addition to the elasticizer component, at least one further elasticiser may be present in the shaped bodies.

The elasticization of the basic shaped bodies according to the invention can be achieved using not only pure calcium hexaaluminate, but it is also possible for secondary phases, e.g. $SiO_2$ and/or $TiO_2$ and/or $Fe_2O_3$ and/or MgO, to be present in amounts of up to 10% by mass in the calcium hexaaluminate. Furthermore, the calcium hexaaluminate also has the action described when up to 58% by mass of the $Al_2O_3$ has been replaced by $Fe_2O_3$ or when $Ca^{2+}$ has been partly replaced by $Ba^{2+}$ or $Sr^{2+}$.

While the above description constitutes the preferred embodiment of the present invention, it will be appreciated that the invention is susceptible to modification, variation and change without departing from the proper scope and fair meaning of the accompanying claims.

The invention claimed is:

1. A fired, basic, refractory, industrial ceramic shaped body comprising
at least one basic resistor component; and
an elasticizer component;
wherein the elasticizer component is a calcium aluminate having a $CaO/Al_2O_3$ ratio of from 0.14 to 0.2;
wherein the shaped body comprises from 60 to 99.5% by mass of the resistor component and from 0.5 to 40% by mass of the elasticizer component; and
wherein the resistor component contains one or more selected from the group consisting of sintered MgO, fused magnesia, sintered dolomite, and fused dolomite.

2. A fired, basic, refractory, industrial ceramic shaped body comprising
at least one basic resistor component; and
an elasticizer component;
wherein the elasticizer component is a calcium aluminate having a $CaO/Al_2O_3$ ratio of from 0.14 to 0.2;
wherein the shaped body comprises from 60 to 99.5% by mass of the resistor component and from 0.5 to 40% by mass of the elasticizer component; and
wherein $Ca^{2+}$ has been partly replaced by $Ba^{2+}$ or $Sr^{2+}$ in the elasticizer component.

3. The shaped body of claim 1 or 2, wherein the elasticizer component has the oxide formula $CaO.6Al_2O_3$.

4. The shaped body of claim 1 or 2, wherein the elasticizer component contains up to 10% by mass of secondary phases.

5. The shaped body of claim 1 or 2, wherein the secondary phases is one or more selected from the group consisting of $SiO_2$, $TiO_2$, $Fe_2O_3$, and MgO.

6. The shaped body as claimed in claim 1 or 2, wherein up to 58% by mass of $Al_2O_3$ is replaced by $Fe_2O_3$ in the elasticizer component.

7. The shaped body as claimed in claim 1 or 2, wherein at least one further elasticizer is present in addition to the elasticizer component.

8. The shaped body as claimed in claim 1 or 2, wherein the body having an overall density of from 2.5 to 3.2 $g/cm^3$.

9. The shaped body as claimed in claim 1 or 2, wherein the body having a porosity of from 12 to 25% by volume.

10. The shaped body as claimed in claim 9, wherein the body having a porosity of from 14 to 23% by volume.

11. The shaped body as claimed in claim 1 or 2, wherein the body having a cold compressive strength above 35 MPa, and a cold flexural strength above 2 MPa.

12. The shaped body as claimed in claim 11, wherein the body having a cold compressive strength above 45 MPa, and a cold flexural strength above 2 MPa.

13. The shaped body as claimed in claim 1 or 2, wherein the body having a modulus of elasticity of from 14 to 35 GPa, and a shear modulus of from 6 to 15 GPa.

14. The shaped body as claimed in claim 13, wherein the body having a modulus of elasticity of from 15 to 32 GPa, and a shear modulus of from 7 to 14 GPa.

15. The shaped body as claimed in claim 1 or 2, wherein the body having a thermal shock resistance of greater than 80.

* * * * *

UNITED STATES PATENT AND TRADEMARK OFFICE
CERTIFICATE OF CORRECTION

PATENT NO. : 7,632,770 B2  Page 1 of 1
APPLICATION NO. : 10/539647
DATED : December 15, 2009
INVENTOR(S) : Hans-Jürgen Klishchat It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 224 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,632,770 B2 Page 1 of 1
APPLICATION NO. : 10/539647
DATED : December 15, 2009
INVENTOR(S) : Hans-Jürgen Klischat It is certified that error appears in the above-identified patent and that said Letters Patent is hereby corrected as shown below:

On the Title Page

Item (75), replace "Klishchat" with --Klischat--.

Item (22), replace "Dec. 29, 2003" with --Sept. 29, 2003--.

In the Claims

In column 6, claim 3, line 7, after "the oxide formula" replace "$CaO.6Al_2O_3$" with --$CaO \cdot 6Al_2O_3$--.

Signed and Sealed this

Seventh Day of December, 2010

David J. Kappos
*Director of the United States Patent and Trademark Office*